Jan. 17, 1956  S. D. HOLMES  2,731,013
CONTAINER FOR HYPODERMIC INJECTION INGREDIENTS
Filed Dec. 23, 1954
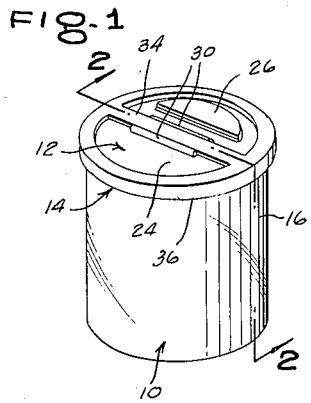
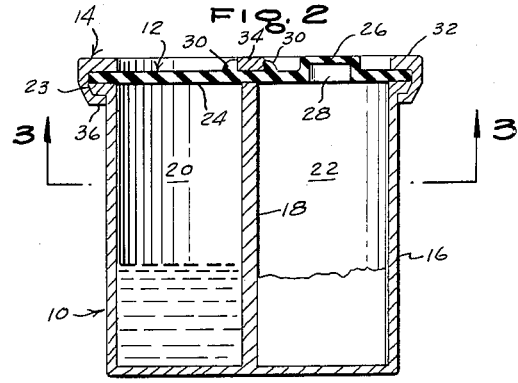
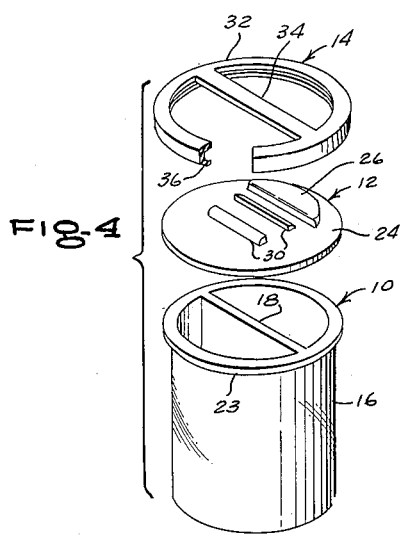
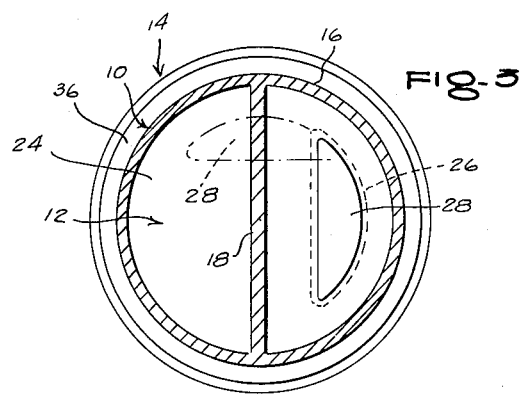
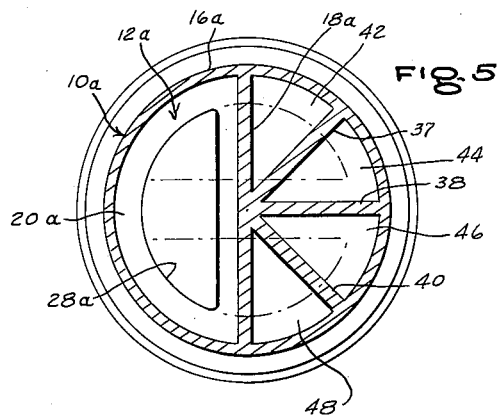
INVENTOR
STANNARD D. HOLMES
BY
McMorrow, Berman + Davidson
ATTORNEYS

2,731,013

CONTAINER FOR HYPODERMIC INJECTION INGREDIENTS

Stannard D. Holmes, Hato Rey, Puerto Rico

Application December 23, 1954, Serial No. 477,200

3 Claims. (Cl. 128—272)

This invention relates to a container, to be used for the storage and mixing of medicines administered by means of a hypodermic needle.

Many medicines that are administered by hypodermic injection are compounded of solid materials, often in granular form, and a liquid solvent. Desirably, such materials in many instances should not be mixed until the injection is to be given, and further, it is additionally desirable that the storage, mixing, and filling of the needle be carried out with a complete minimum of contamination of the medicine by contact with the outside air.

To this end, the invention, summarized briefly, comprises a partitioned container having a solvents compartment and a solids compartment. A rotatable lid is provided upon the container, and is secured to the container by means of a sealing ring rotatable with the lid. The lid is formed with an upwardly offset or raised portion defining in its underside a downwardly facing recess extending approximately circumferentially of the lid. In one position to which the lid is rotated, the recess bridges the compartments, to cause the compartments to communicate with one another. The container may then be shaken vigorously and the previously separated solids and the solvent will be completely intermixed. Thereafter, a hypodermic needle may be injected through the material of the raised portion and in this way is charged with the medicine without opening of the container. The medicine may thus be maintained in a wholly sterile condition, with the ingredients thereof properly proportioned prior to deposit in the container, and maintained in an unmixed state until immediately before the injection is to be given.

Among important objects of the present invention are to provide a generally improved partitioned container of the type stated, which will insure the complete separation of the ingredients in sealed compartments under normal conditions, but which will communicate the compartments for intermixing of the ingredients without in any way breaking the sealing means of the container that protects the ingredients from contamination by the outer atmosphere.

Another object is to provide a particular formation of the lid and associated sealing ring, which will cause the sealing ring to become interengaged with the lid for joint rotation, with the sealing ring additionally serving to press the lid firmly into engagement with the container wall throughout the lid periphery, to insure against the admission of air into the container.

Another object is to so form the lid as to facilitate the use thereof not only as a sealing gasket, but also as a means normally imperforate, but readily penetrable by the hypodermic needle when the needle is charged with the mixed substance.

Other objects will appear from the following description, the claims appended thereto, and from the annexed drawing, in which like reference characters designate like parts throughout the several views, and wherein:

Figure 1 is a perspective view of a medicine container formed according to the present invention;

Figure 2 is an enlarged sectional view taken longitudinally through the container on line 2—2 of Figure 1;

Figure 3 is a transverse sectional view on line 3—3 of Figure 2;

Figure 4 is an exploded perspective view of the container, a portion of the sealing ring being broken away; and Figure 5 is a view similar to Figure 3 showing a modified construction.

The container constitutes three main components, these being a receptacle generally designated 10, a lid 12, and a connecting ring 14. Each of these will be described in turn hereinafter.

The receptacle 10 includes a side wall of cylindrical formation designated by the reference numeral 16, said side wall being integral with a flat bottom and with a diametrically extending partition 18 coextensive in height with the side wall as best shown in Figures 2 and 4. The partition divides the container into a pair of side-by-side compartments 20, 22 of equal area, for solvents and solids respectively. In this connection, in some circumstances it may be desired to have compartments of unequal areas, as for example, when a substantial quantity of solvent is needed as compared to the relatively small quantity of solids. Under these circumstances, the partition might be located elsewhere than as shown, but in every instance, the partition will completely separate the solids from the solvents, so as to prevent intermixing thereof until such time as they are to be mixed preparatory to the giving of a hypodermic injection.

Further, the receptacle wall can and in all probability would be made transparent so as to permit visual observation of the mixing operation. Of course, a predetermined quantity of the solvents and solids is inserted in each of the respective compartments, so that there is no necessity of the user having to measure out the particular ingredients preparatory to the giving of the hypodermic injection.

Integrally formed upon the upper end of the wall 16, and extending continuously through the full circumference of said wall, is an outwardly directed flange 23 having a beveled outside edge, said flange lying in a plane normal to the axis of the receptacle.

The lid 12 includes a flat, circular body 24 the diameter of which is equal to the outer diameter of the flange 23, as shown in Figure 2. The flat, disc-like body 24 is formed of a compressible rubber or other suitable sealing material capable of being readily penetrated by a hypodermic needle, not shown, when said needle is to be inserted in the receptacle for the purpose of being charged with the mixed substance.

The body 24 of the lid is formed, inwardly from the margin thereof, with a crescent-shaped, upwardly offset or raised portion 26 defining on the underside of the lid a downwardly facing, crescent-shaped recess 23 normally opening into one or the other of the compartments, but not into both compartments simultaneously.

Integrally formed upon the top surface of the lid body 24, at opposite sides of and in closely spaced relation to the center point of the lid, are elongated ribs 30.

The connector ring 32 can be formed of a metal material, or of plastic, and includes a flat annular body 32 having an inner diameter slightly less than the diameter of the lid body 24, so as to overlie the marginal portion of the lid body. Integrally formed upon the annular member 32 and extending diametrically thereof in coplanar relation to the annular member, is a cross bar 34 of a width equal to the distance between the ribs 30, thus to cause said cross bar to snugly engage between the ribs as shown in Figures 1 and 2. The annular member 32, at its outer periphery, is integrally formed with a depending, circumferential flange having an inwardly turned lip 36 at its bottom engaging under the outwardly directed flange 23 of the receptacle.

At the time the receptacle is sealed in this manner, the recess 28 is disposed in communication with a selected one of the compartments, it being immaterial which compartment the recess communicates with at this time.

Whenever a hypodermic injection is to be given, it is merely necessary that the connector ring be rotated through approximately 90°, and this will cause rotation of the lid 12 therewith, due to the interengagement of the cross bar 34 and ribs 30. As a result, the recess 28 will move to the dotted line position of Figure 3, in which position it bridges the compartments 20, 22, to bring said compartments to communication with each other.

The container may now be inverted and shaken to fully intermix the ingredients, and when the solids are completely dissolved, a hypodermic needle is inserted through the material of the raised portion 26 with the container held in inverted position, to permit the needle to be charged with the complete quantity of the medicinal preparation. The device is thus a single use container, in which the properly proportioned, separated ingredients are hermetically sealed in a sterile condition, with said container being adapted to permit intermixing of the ingredients while the container is still wholly sealed. The hypodermic is charged with the preparation without breaking the seal of the container, and thus maximum precautions against contamination of the substance are assured due to the construction illustrated and described.

In the form of Figure 5, the receptacle 10a has a lid 12a formed with a recess 28a somewhat larger than recess 28 of the first form. Extending diametrically of the side wall 16a of the receptacle is a main partition 18a dividing the receptacle interior into equal side by side areas one of which comprises a main compartment 20a.

Integral with partition 18a and radiating from the center of the receptacle are auxiliary partitions 37, 38, 40 defining, at the side of the partition 18a opposite compartment 20a, segmentally shaped, auxiliary compartments 42, 44, 46 and 48.

This construction is particularly adapted for multiple injections such as are used in vitamin injections. For example, by rotating lid 12a from its full line position in a clockwise direction through slightly less than 90 degrees, recess 28a bridges compartments 20a, 42, and 44 for intermixing of the ingredients contained in these compartments. Rotation of lid 12a in a counterclockwise direction, on the other hand causes recess 28a to bridge compartments 20a, 48, and 46 for intermixing of their contents.

Thus, compartment 20a may contain a main injection ingredient, that is to be common to both of a pair of successively administered injections. Of course, any number of compartments might be designed for grouping of selected side-by-side compartments responsive to rotation of the lid to any of various selected positions.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

1. A container for hypodermic injection ingredients, comprising a receptacle formed open at one end and divided into a plurality of compartments for the several ingredients; a connector ring rotatably mounted on said end of the receptacle; and a receptacle lid engaged with the ring for rotation therewith and having at least one recess opening inwardly of the receptacle, said recess being adapted to bridge at least two of the compartments on rotation of the lid to a selected position, thus to communicate the bridged compartments with one another for intermixing of the ingredients contained therein.

2. A container for hypodermic injection ingredients, comprising a receptacle formed open at one end and divided into a plurality of compartmtnts for the several ingredients; a connector ring rotatably mounted on said end of the receptacle; and a receptacle lid engaged with the ring for rotation therewith and having at least one recess opening inwardly of the receptacle, said recess being adapted to bridge at least two of the compartments on rotation of the lid to a selected position, thus to communicate the bridged compartments with one another for intermixing of the ingredients contained therein, said lid being formed of a compressible sealing material and being compressed against the receptacle at the margin of the lid by the connector ring, the lid being adapted to be penetrated by a hypodermic needle for charging of the needle with the intermixed ingredients.

3. A container for hypodermic injection ingredients comprising a receptacle formed open at one end, said receptacle at its open end including a circumferential, outwardly directed flange, the receptacle including a partition dividing the same into a plurality of compartments for individual ingredients to be mixed, the partition terminating in the plane of the open end of the receptacle; a lid covering said open end of the receptacle and having an outer diameter equal to the outer diameter of the receptacle flange, the marginal portion of the lid being supported upon said receptacle flange, said lid being formed with an upwardly raised portion at a location spaced from the center of the lid, defining a downwardly opening recess in the lid opening inwardly of the container, the lid further including a pair of spaced ribs disposed at opposite sides of the lid center; and a connector ring overlying the marginal portion of the lid, the lid being formed of a compressible material penetrable by a hypodermic needle, for compression of the marginal portion of the lid by the connector ring against the receptacle flange, thereby to seal the receptacle, said connector ring including a diametrically extending cross bar extending between and engaged at its opposite sides by the lid ribs, for connecting the ring and lid for joint rotation, the connector ring further including a depending peripheral flange engaged under the receptacle flange, said connector ring and lid, when rotated to one position upon the receptacle, being adapted to dispose said recess transversely of the partition, so as to communicate the compartments of the receptacle to permit intermixing of the ingredients.

References Cited in the file of this patent

UNITED STATES PATENTS

| | | |
|---|---|---|
| 1,343,299 | Barrows | June 15, 1920 |
| 1,736,264 | Johnson | Nov. 19, 1929 |
| 2,142,278 | Mendelson | Jan. 3, 1939 |
| 2,527,991 | Greenberg | Oct. 31, 1950 |